(12) United States Patent
Shen et al.

(10) Patent No.: US 12,414,204 B2
(45) Date of Patent: Sep. 9, 2025

(54) ATTACHABLE SELF-RESISTANCE HEATING/SUPER-HYDROPHOBIC INTEGRATED GRADIENT FILM MATERIAL

(71) Applicant: NANJING UNIVERSITY OF AERONAUTICS AND ASTRONAUTICS, Jiangsu (CN)

(72) Inventors: Yizhou Shen, Jiangsu (CN); Jie Tao, Jiangsu (CN); Zhen Wang, Jiangsu (CN); Zhengwei Wu, Jiangsu (CN); Zhaoru He, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 898 days.

(21) Appl. No.: 17/630,530

(22) PCT Filed: Apr. 17, 2020

(86) PCT No.: PCT/CN2020/085276
§ 371 (c)(1),
(2) Date: Jan. 27, 2022

(87) PCT Pub. No.: WO2021/031591
PCT Pub. Date: Feb. 25, 2021

(65) Prior Publication Data
US 2022/0248501 A1    Aug. 4, 2022

(30) Foreign Application Priority Data
Aug. 16, 2019 (CN) .......................... 201910760711.1

(51) Int. Cl.
B64D 15/12 (2006.01)
B32B 7/12 (2006.01)
(Continued)

(52) U.S. Cl.
CPC ............. H05B 3/146 (2013.01); B64D 15/12 (2013.01); C09J 7/29 (2018.01); C09J 7/30 (2018.01);
(Continued)

(58) Field of Classification Search
CPC ... C09J 7/29; H05B 3/14; B64D 15/12; B64D 15/00; B32B 7/12
See application file for complete search history.

(56) References Cited

U.S. PATENT DOCUMENTS

| | | | | |
|---|---|---|---|---|
| 8,146,861 | B2* | 4/2012 | Lengsfeld | B64C 1/12 244/121 |
| 9,771,656 | B2* | 9/2017 | Aytug | C23C 30/00 |

(Continued)

FOREIGN PATENT DOCUMENTS

| | | |
|---|---|---|
| CN | 108250898 | 7/2018 |
| CN | 108454816 | 8/2018 |

(Continued)

OTHER PUBLICATIONS

"International Search Report (Form PCT/ISA/210) of PCT/CN2020/085276," mailed on Jul. 6, 2020, with English translation thereof, pp. 1-4.

(Continued)

*Primary Examiner* — Ibrahime A Abraham
*Assistant Examiner* — Lawrence H Samuels
(74) *Attorney, Agent, or Firm* — JCIPRNET

(57) ABSTRACT

An attachable self-resistance heating/super-hydrophobic integrated gradient film material. The film material is made of an adhesive resin, an electrically and thermally insulative resin, a thermally and electrically conductive filler, and a thermally conductive insulating filler. The adhesive resin and the electrically and thermally insulative resin respectively form an adhesive layer and a base body, and the two (Continued)

are bonded together. The thermally and electrically conductive filler and the thermally conductive insulating filler are respectively added to an intermediate layer and an upper layer of the base body, to divide the base body into three gradient regions from top to bottom, wherein a super-hydrophobic structure is constructed on the surface of the uppermost area.

9 Claims, 1 Drawing Sheet

(51) Int. Cl.
    *B64D 15/00*     (2006.01)
    *C09J 7/29*     (2018.01)
    *C09J 7/30*     (2018.01)
    *C09J 9/02*     (2006.01)
    *C09J 11/04*     (2006.01)
    *H05B 3/14*     (2006.01)

(52) U.S. Cl.
    CPC ............. *C09J 9/02* (2013.01); *C09J 11/04* (2013.01); *C09J 2203/326* (2013.01); *C09J 2301/41* (2020.08); *C09J 2427/006* (2013.01); *C09J 2463/00* (2013.01); *C09J 2475/00* (2013.01); *C09J 2483/006* (2013.01)

(56) References Cited

U.S. PATENT DOCUMENTS

| | | | | |
|---|---|---|---|---|
| 10,011,800 | B2 * | 7/2018 | Aizenberg | ............ C10M 177/00 |
| 10,183,754 | B1 * | 1/2019 | Agarwal | ................ F02C 7/047 |
| 10,486,379 | B2 * | 11/2019 | Hu | ......................... H05B 3/145 |
| 2003/0152766 | A1 * | 8/2003 | Vargo | ........................ B32B 7/12 |
| | | | | 428/343 |
| 2006/0257663 | A1 * | 11/2006 | Doll | ...................... C23C 28/048 |
| | | | | 428/408 |
| 2006/0292345 | A1 * | 12/2006 | Dave | ................... D06M 13/513 |
| | | | | 428/141 |
| 2009/0181239 | A1 * | 7/2009 | Fan | ....................... B29C 43/203 |
| | | | | 156/60 |
| 2013/0189485 | A1 * | 7/2013 | Gupta | ................... B29D 11/00 |
| | | | | 264/293 |
| 2014/0147627 | A1 * | 5/2014 | Aizenberg | ................ F15D 1/02 |
| | | | | 428/141 |
| 2014/0151353 | A1 * | 6/2014 | Steinwandel | .......... B64D 15/12 |
| | | | | 219/202 |
| 2015/0122947 | A1 * | 5/2015 | Bruce | ....................... B32B 3/26 |
| | | | | 244/134 C |
| 2015/0210400 | A1 * | 7/2015 | Gonidec | ................ B64D 15/16 |
| | | | | 415/178 |
| 2016/0114883 | A1 * | 4/2016 | Guerry | .................. B08B 17/065 |
| | | | | 428/141 |
| 2017/0002475 | A1 | 1/2017 | Strobl et al. | |
| 2018/0014357 | A1 * | 1/2018 | Christy | .................... H05B 3/03 |
| 2018/0265217 | A1 * | 9/2018 | Ballocchi | .............. B29C 70/081 |
| 2019/0118523 | A1 * | 4/2019 | Chiang | .................... B29C 65/48 |
| 2019/0193862 | A1 * | 6/2019 | Kinlen | ................... H05B 3/145 |

FOREIGN PATENT DOCUMENTS

| | | |
|---|---|---|
| CN | 109794404 | 5/2019 |
| CN | 109957131 | 7/2019 |
| CN | 110510102 | 11/2019 |

OTHER PUBLICATIONS

"Written Opinion of the International Searching Authority (Form PCT/ISA/237) of PCT/ CN2020/085276," mailed on Jul. 6, 2020, pp. 1-4.

\* cited by examiner

ATTACHABLE SELF-RESISTANCE HEATING/SUPER-HYDROPHOBIC INTEGRATED GRADIENT FILM MATERIAL

CROSS-REFERENCE TO RELATED APPLICATION

This application is a 371 of international application of PCT application serial no. PCT/CN2020/085276, filed on Apr. 17, 2020, which claims the priority benefit of China application no. 201910760711.1, filed on Aug. 16, 2019. The entirety of each of the above mentioned patent applications is hereby incorporated by reference herein and made a part of this specification.

TECHNICAL FIELD

The present invention relates to a film material, in particular, to an attachable self-resistance heating/super-hydrophobic integrated gradient film material, and belongs to the technical field of anti-icing and de-icing in aerospace.

DESCRIPTION OF RELATED ART

The ice accumulation of an aircraft in a high-altitude supercooled environment can increase flight resistance, reduce the stability of the aircraft and further cause serious flight problems. Therefore, an anti-icing and de-icing system installed on the aircraft is an indispensable important device for ensuring the safe flight of the aircraft. At present, the most widely used de-icing system on the aircraft is an electrothermal de-icing system. In the conventional electrothermal de-icing system, metal materials are usually adopted as electrothermal elements for the de-icing system, and a plurality of heating units are symmetrically arranged on the main-wing leading edge to be protected to heat the easy-to-freeze parts of the aircraft. For example, the main-wing leading edges of a Boeing 787 are sprayed with metal powders on the glass fiber surfaces to prepare a GKN electrothermal lining for electrothermal de-icing. Although the conventional electrothermal de-icing system has the advantages of high de-icing efficiency, there are a series of obvious disadvantages as follows:

1. the electrothermal elements are distributed in the aircraft skin, with each electrothermal element controlled by a complicated electronic controller and a complex logic program, resulting in extremely high installation and maintenance costs; and 2. the electrothermal element mainly adopts metallic electrically and thermally conductive materials, resulting in greatly increased self-weight of the aircraft, increased oil consumption of the aircraft, and increased flight cost.

De-icing is performed under the condition that aircraft fuselage is coated with ice, which has certain limitations. Therefore, people pay attention to the research on icing process and hope to realize effective anti-icing of the aircraft fuselage by delaying the icing. The most effective way among anti-icing measures is to construct a super-hydrophobic structure on the surface of a substance with low surface energy. The conventional low surface energy coating has the disadvantages of low thermal conductivity coefficient, and if the coating is directly applied to the aircraft fuselage, the heat transfer efficiency of electrothermal elements inside the aircraft is limited. Therefore, the low surface energy coating is not widely applied to the fuselages of aircrafts in service. In addition, the super-hydrophobic structure belongs to a micro-nano structure, which can be easily damaged under the action of aerodynamic force generated when the aircraft flies at high speed, leading to unideal anti-icing effects. Besides, the micro-nano structure of the conventional coating is difficult to repair. Therefore, for aircrafts currently in service, the fuselage surfaces are rarely treated with the super-hydrophobic structure coating.

In view of the defects of the electrothermal de-icing and the super-hydrophobic structure anti-icing, Chinese patent CN108454816A provides a novel anti-icing and de-icing skin with a micro-nano structure surface, and explicitly describes that a super-hydrophobic layer is connected with an electrothermal layer through high-temperature film pressure or an adhesive, and the super-hydrophobic layer is obtained by coating with a super-hydrophobic film. It can be seen that the novel skin simply combines the electrothermal layer and the super-hydrophobic structure. The design of bonding all layers with an adhesive belongs to the technical field of laminate, residual stress existing in the laminates and thermal stress generated when the electrothermal layer is electrified can obviously weaken interface adhesion force, shorten the service life of the skin, and finally lead to skin layering. In addition, the super-hydrophobic layer of the novel skin is prepared from polyimide with low thermal conductivity, and a thermally conductive insulating adhesive is selected as a back adhesive, so that heat generated by the electrothermal layer cannot be directionally transferred to the surface of the novel skin.

Therefore, it is necessary to develop a film material which has no interface problem, and features good mechanical properties, light weight, convenient adhesion, high heat transfer efficiency, low cost and repairable super-hydrophobic structure.

SUMMARY

In order to solve the defects in the prior art, the present invention provides an attachable self-resistance heating/super-hydrophobic integrated gradient film material.

For the above purposes, the present invention adopts technical schemes as follows.

Provided is an attachable self-resistance heating/super-hydrophobic integrated gradient film material prepared from an adhesive resin, an electrically and thermally insulative resin, a thermally and electrically conductive filler and a thermally conductive insulating filler, wherein:

the adhesive resin and the electrically and thermally insulative resin form an adhesive layer and a base body bonded together, respectively, with the base body on the adhesive layer;

the thermally and electrically conductive filler and the thermally conductive insulating filler are added into an intermediate layer and an upper layer of the base body, respectively; the base body is divided into three gradient regions from top to bottom: a thermally conductive insulating region, an electrically and thermally conductive region and an electrically and thermally insulative region, wherein a super-hydrophobic structure is constructed on the surface of the thermally conductive insulating region.

In the attachable self-resistance heating/super-hydrophobic integrated gradient film material, the electrically and thermally insulative resin is selected from an electrically and thermally insulative resin with a surface energy lower than 50 mN/m.

In the attachable self-resistance heating/super-hydrophobic integrated gradient film material, the electrically and thermally insulative resin with the surface energy lower than 50 mN/m is selected from a silicone-based resin and a series of fluorine-modified resins.

In the attachable self-resistance heating/super-hydrophobic integrated gradient film material, the silicone-based resin is selected from polydimethylsiloxane resin, methylphenyl silicone resin and amino silicone resin.

In the attachable self-resistance heating/super-hydrophobic integrated gradient film material, the series of fluorine-modified resins are selected from fluorine-modified silicone resin, fluorine-modified acrylate resin and fluorine-modified polyurethane resin.

In the attachable self-resistance heating/super-hydrophobic integrated gradient film material, the super-hydrophobic structure on the surface of the thermally conductive insulating region is constructed by a micro-nano hot embossing.

In the attachable self-resistance heating/super-hydrophobic integrated gradient film material, the thermally conductive insulating filler is selected from graphene oxide, aluminum nitride ceramic and boron nitride ceramic.

In the attachable self-resistance heating/super-hydrophobic integrated gradient film material, the thermally and electrically conductive filler is selected from silver powder particles, copper powder particles, graphite and carbon nanotubes.

In the attachable self-resistance heating/super-hydrophobic integrated gradient film material, the adhesive resin is selected from epoxy AB glue, polyurethane adhesive and 3M quick-drying glue.

In the attachable self-resistance heating/super-hydrophobic integrated gradient film material, the thermally conductive insulating region, the electrically and thermally conductive region and the electrically and thermally insulative region are separately prepared, and then subjected to a semi-curing, followed by a joining and then a full-curing, to form the three gradient regions.

The present invention has the advantages as follows:

(1) compared with a conventional electrothermal laminated structure, in the attachable self-resistance heating/super-hydrophobic integrated gradient film material provided by the present invention, an main body part (base body) only adopts an electrically and thermally insulative resin with low surface energy, so that the structure is not influenced by interfaces of different material layers, which realizes the functionalization of different regions, significantly improves mechanical property, and avoids easy layering;

(2) the adhesive resin has a good adhesive performance for the electrically and thermally insulative resin and the aircraft skin substrate, thereby improving the adhesive strength of the interface between the film material and the aircraft fuselage, and ensuring that the film material is bonded when used at room temperature; and (3) the attachable self-resistance heating/super-hydrophobic integrated gradient film material provided by the present invention integrates anti-icing function and de-icing function, thereby effectively delaying icing, realizing electrothermal de-icing with low energy consumption, and finally improving the energy efficiency of an aircraft.

Figure 1:
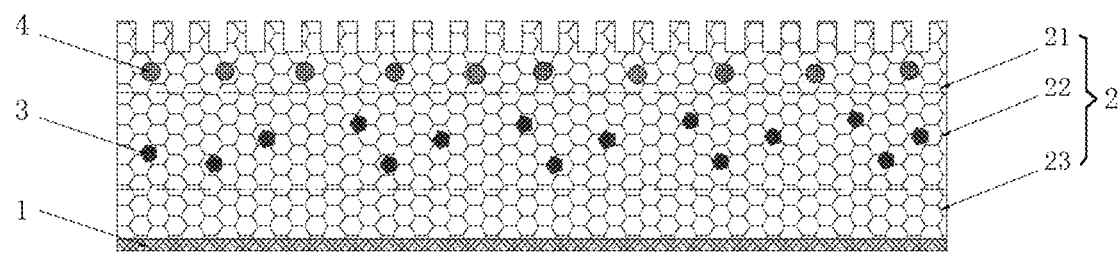
FIG. 1 is a schematic diagram of the structure of the attachable self-resistance heating/super-hydrophobic integrated gradient film material provided by the present invention.

The reference numerals in the drawings have following meanings: 1 represents an adhesive layer, 2 represents a base body, 3 represents a thermally and electrically conductive filler, 4 represents a thermally conductive insulating filler, 21 represents a thermally conductive insulating region, 22 represents an electrically and thermally conductive region, 23 represents an electrically and thermally insulative region, 51 represents a concavity, and 52 represents a convexity.

DESCRIPTION OF THE EMBODIMENTS

The present invention is described in detail below with reference to the drawings and specific embodiments.

Figure 2:
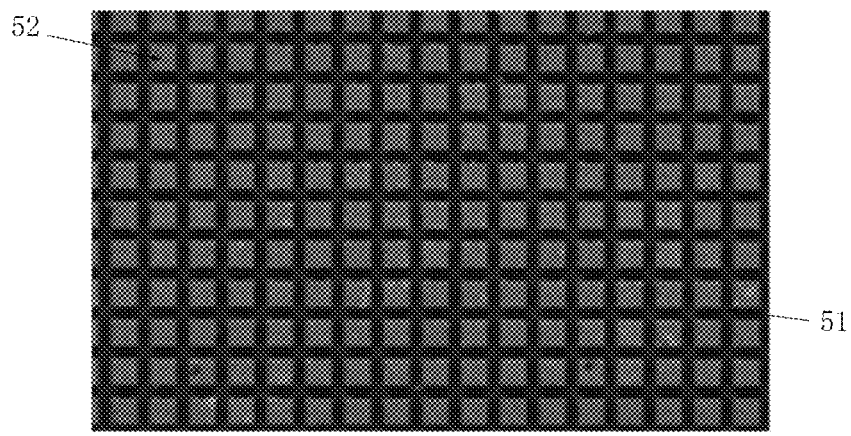
FIG. 2 is a schematic diagram of the super-hydrophobic structure on the surface of the attachable self-resistance heating/super-hydrophobic integrated gradient film material in FIG. 1.

Referring to FIG. 1, the attachable self-resistance heating/super-hydrophobic integrated gradient film material provided by the present invention is prepared from an adhesive resin, an electrically and thermally insulative resin, a thermally and electrically conductive filler 3 and a thermally conductive insulating filler 4, wherein:

the adhesive resin and the electrically and thermally insulative resin form an adhesive layer 1 and a base body 2 bonded together, respectively, with the base body 2 on the adhesive layer 1;

the thermally and electrically conductive filler 3 and the thermally conductive insulating filler 4 are added into an intermediate layer and an upper layer of the base body 2, respectively; the base body 2 is divided into three gradient regions from top to bottom: a region 21, an electrically and thermally conductive region 22 and an electrically and thermally insulative region 23, wherein a super-hydrophobic structure (as shown in FIG. 2) is constructed on the surface of the thermally conductive insulating region 21, wherein the super-hydrophobic structure is thermally conductive but electrically insulative and can remarkably improve the hydrophobic performance of a film material; the electrically and thermally insulative resin in the electrically and thermally insulative region 23 is not treated, so that current and heat flow can be prevented from leaking to the surface of an aircraft skin, and unnecessary energy waste can be avoided.

In one preferred embodiment, the electrically and thermally insulative resin is selected from an electrically and thermally insulative resin with surface energy lower than 50 mN/m. By controlling the surface energy of the film material (selecting electrically and thermally insulative resin with lower surface energy), the hydrophobic performance of the film material can be improved, thereby ensuring that the film material in service can play a good anti-icing role even if a super-hydrophobic structure is damaged.

More preferably, the electrically and thermally insulative resin with surface energy lower than 50 mN/m is selected from a silicone-based resin and a series of fluorine-modified resins, wherein the silicone-based resin is selected from polydimethylsiloxane resin, methylphenyl silicone resin, amino silicone resin, and the like; the series of fluorine-modified resins are selected from fluorine-modified silicone resin, fluorine-modified acrylate resin, fluorine-modified polyurethane resin, and the like.

In one preferred embodiment, the super-hydrophobic structure on the surface of the thermally conductive insulating region 21 is constructed by micro-nano hot embossing. The micro-nano hot embossing technology can repair the damaged super-hydrophobic structure in service in time, and a new film material is required as a replacement only when the thermally conductive insulating region 21 is completely consumed by hot embossing treatment and aerodynamic force.

In one preferred embodiment, the thermally conductive insulating filler 4 is selected from graphene oxide, aluminum nitride ceramic and boron nitride ceramic, and these fillers can realize the electrical insulation and thermal conduction functions of the film material, improve thermal conduction efficiency and avoid current leakage on the aircraft surface.

Figure 3:
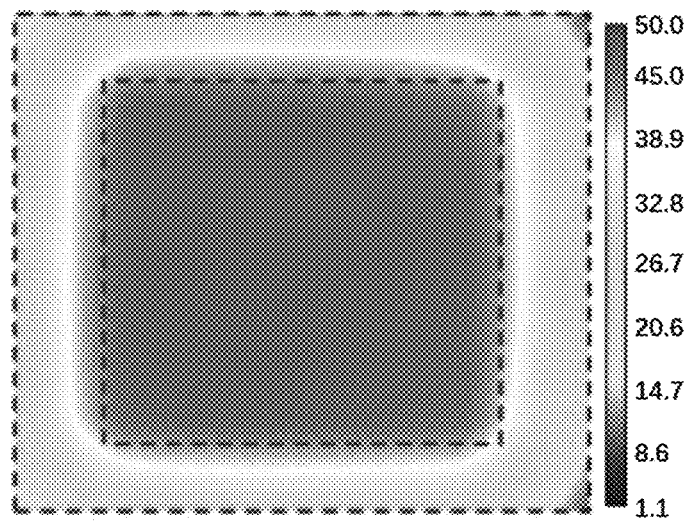
FIG. 3 is a schematic diagram of Joule heat performance of the surface of the attachable self-resistance heating/super-hydrophobic integrated gradient film material provided by the present invention.

In one preferred embodiment, the thermally and electrically conductive filler 3 is selected from silver powder particles, copper powder particles, graphite and carbon nanotubes, and these fillers can convert electrical energy into heat energy by Joule effect (as shown in FIG. 3), and further high-efficiently conduct the heat energy to the surface of the film material.

In one preferred embodiment, the adhesive resin is selected from epoxy AB glue, polyurethane adhesive, 3M quick-drying glue, and the like. The adhesive resin is a room temperature curing adhesive with good adhesive performance for both an aircraft skin substrate and an electrically and thermally insulative resin, and can realize the purpose that the film material is bonded when used while the shearing resistance of the film material is improved.

The method for preparing the attachable self-resistance heating/super-hydrophobic integrated gradient film material comprises the following:

a thermally conductive insulating region 21, an electrically and thermally conductive region 22 and an electrically and thermally insulative region 23 are separately prepared, and then subjected to semi-curing, followed by joining and then full-curing, to form three gradient regions; then a super-hydrophobic structure is constructed on the surface of the thermally conductive insulating region 21 by micro-nano hot embossing, and finally the whole base body 2 and the adhesive layer 1 are bonded together. Because the same electrically and thermally insulative resin is used for curing, the interface layering occurring in the conventional electrothermal laminate technology is avoided, and thus the excellent mechanical performance of the film material can be realized.

When the film material is used, the electrically and thermally conductive region 22 is externally connected with a low-voltage power supply through electrode/wire, and the whole film material can generate heat energy after being electrified.

Referring to FIG. 2, the core of the super-hydrophobic structure anti-icing technology is to construct a micro-nano concave-convex structure, wherein a stable "air layer" is formed in a concavity 51, and heat cannot be transferred through the "air layer" when supercooled liquid drops contact the surface of the super-hydrophobic structure since air is a poor thermal conductor, so that icing is delayed; in addition, the liquid drops cannot enter the concavity 51 due to surface tension, so that only convexities 52 on the surface of an aircraft are coated with ice.

Instead of melting all the ice coating on the surface of the film material, only a thin layer of ice in contact with the film material needs to be melted by electrothermal de-icing technology into a layer of "water film". The adhesion force of the "water film" on the surface of the film material is far smaller than that of the ice layer on the surface of the film material, so that the "water film" can be blown off by aerodynamic force generated by an aircraft flying at high speed, and thus de-icing is realized.

Based on the above basic theory of electrothermal de-icing, it can be known that the smaller the contact area between the ice coating and the aircraft skin is, the lower the required electrothermal power consumption is. In view of the super-hydrophobic structure anti-icing theory, because the ice coating is only contacted with the convexities of the super-hydrophobic structure, and the concavities have the "air layer" with extremely low thermal conductivity coefficient, the concave-convex super-hydrophobic structure can effectively reduce the contact area between the ice coating and the film material and improve the thermal conduction efficiency, thereby realizing the great reduction of the de-icing power consumption.

The working principle of the attachable self-resistance heating/super-hydrophobic integrated gradient film material provided by the present invention is as follows:

when an aircraft flies in a high-altitude supercooled environment, supercooled liquid drops collide with the attachable self-resistance heating/super-hydrophobic integrated gradient film material; at the moment, due to the low surface energy and the super-hydrophobic structure of the film material, the static contact angle of the supercooled liquid drops on the surface of the film material is increased and the rolling contact angle is reduced, causing the supercooled liquid drops to roll off the surface of the film material as the aircraft flies with the shape of the liquid drops retained, and thus significantly prolonging the icing time; however, with the constant high-speed impact of the supercooled liquid drops, "nail sticking" is inevitably occurred and thus an ice coating layer is formed on the surface of the film material; at the moment, the electrically and thermally conductive region is electrified with low-voltage power supply to form a closed loop, and thus electrical energy is converted into heat energy based on the Joule effect; the heat energy is blocked by electrically and thermally insulative region with low thermal conductivity when the heat energy diffuses to the outside of the electrically and thermally conductive region, and it can only diffuse to the surface of the super-hydrophobic structure through the upper thermally conductive insulating region with high thermal conduction coefficient, and further to the ice coating layer in contact with the surface of the super-hydrophobic structure; the ice layer is melted into a "water film" by the heat energy, thus reducing the adhesion force between the ice coating layer and the super-hydrophobic structure, and the "water film" on the surface of the film material is blown off under the action of the aerodynamic force generated when the aircraft flies at high speed.

The saved power consumption of the attachable self-resistance heating/super-hydrophobic integrated gradient film material for anti-icing and de-icing is analyzed in terms of a super-hydrophobic anti-icing stage and an electrothermal de-icing stage. Because different super-hydrophobic materials and different super-hydrophobic structures can influence the delayed icing and the electrothermal energy consumption, specific numerical values are not strictly controlled, and only approximate theoretical estimation is performed on the power consumption.

1. Super-Hydrophobic Anti-Icing Stage

In a high-humidity environment at −5° C., the icing time of supercooled liquid drops on the surface of the attachable self-resistance heating/super-hydrophobic integrated gradient film material with the super-hydrophobic structure provided by the present invention is about 2-2.5 times that on a conventional surface, and the film material can delay icing for 5-10 min. Under the condition that the flight range of the aircraft is constant, delaying icing for 5 min is of great significance, which means that 5 min of power consumption in one cycle of electrothermal de-icing is saved.

2. Electric Heating De-Icing Stage

Assuming that the super-hydrophobic structure on the surface of the attachable self-resistance heating/super-hydrophobic integrated gradient film material provided by the present invention is a cubic column-shaped hydrophobic matrix structure with an interval of a μm and an area of a μm×a μm, with the areas of cubic columns and concavity interfaces being the same, since only one thin layer of ice in contact with the film material needs to be melted by electrothermal de-icing, and the ice coating contact area can be reduced by about half through the hydrophobic matrix structure of the film material, the power consumption required by heating can also be reduced by about half.

Based on the power consumption analysis of each stage, assumptions as follows can be made: the complete icing time of the untreated skin surface of the aircraft is 5 min, the complete icing time of the attachable self-resistance heating/super-hydrophobic integrated gradient film material provided by the present invention is 10 min, and the electrical heating time after the surfaces of the two materials are coated with ice is 5 min.

The time of a flight course is set as z, the number of the heating cycles for the surface of an untreated skin is set as x, the number of the heating cycles for the surface of the attachable self-resistance heating/super-hydrophobic integrated gradient film material provided by the present invention is set as y, and the following equation can be given under the condition that the time of the flight course z is constant:

$$(5+5)x = (10+5)y = z$$

the result is obtained:

$$x/y = 3/2$$

Then the power consumption of electric heating required by a cycle of anti-icing and de-icing on the surface of the attachable self-resistance heating/super-hydrophobic integrated gradient film material provided by the present invention is set as k, and the power consumption required by a cycle of heating on the surface of an untreated skin is set as 2 k.

Under the condition that the time of the flight course z is constant, the total power consumption ratio of the electrical heating on the surface of the untreated skin and the electrical heating on the surface of the attachable self-resistance heating/super-hydrophobic integrated gradient film material provided by the present invention is as follows:

$$3 \times 2k/(2 \times k) = 3$$

In other words, in this assumption, the attachable self-resistance heating/super-hydrophobic integrated gradient film material provided by the present invention reduces the total power consumption by about three times compared with conventional electrothermal elements.

Therefore, the attachable self-resistance heating/super-hydrophobic integrated gradient film material provided by the present invention has the following advantages.

1. The attachable self-resistance heating/super-hydrophobic integrated gradient film material is simple in structure and convenient to use. It is prepared from only two resins and two fillers. On the inner side is an adhesive resin, which can realize the well bonding of the film material to an aircraft base body at room temperature, greatly improving interface shearing mechanical performance; on the outer side is an electrically and thermally insulative resin, which can realize the electrothermal effect on the surface of the aircraft by only adding different fillers through integrated gradient design, can show good mechanical performance, and avoids the layering occurring in a conventional electrothermal element laminated structure.

2. The attachable self-resistance heating/super-hydrophobic integrated gradient film material is bonded when used, and the electrothermal effect can be realized without modifying the surface and the internal structure of an aircraft base body. Compared with electrothermal elements currently used in aircrafts, the provided film material has the advantages of lower installation and maintenance cost and lighter weight, and thus can noticeably reduce the flight oil consumption cost.

3. The attachable self-resistance heating/super-hydrophobic integrated gradient film material integrates anti-icing and de-icing technologies, can effectively delay the icing of an aircraft, and has shorter electrifying time based on the determined flight range of the aircraft; in addition, only the ice layer in contact with the surface of the super-hydrophobic structure needs to be melted when the aircraft is electrified for de-icing, so that the contact area is smaller, the de-icing amount is less, the required power consumption is lower, and the de-icing efficiency and the energy efficiency of the aircraft are greatly improved.

4. The super-hydrophobic structure of the attachable self-resistance heating/super-hydrophobic integrated gradient film material is realized by a micro-nano hot embossing technology, a thermally conductive insulating region can be embossed repeatedly to guarantee effectiveness of the super-hydrophobic structure, and thus the reusability is high.

It should be noted that the above description is the preferred embodiments of the present invention. For those skilled in the art, modifications, changes, replacements and variations made to the embodiments without departing from the principle and spirit of the present invention shall fall within the protection scope of the present invention according to the teachings of the present invention.

What is claimed is:

1. An attachable self-resistance heating/super-hydrophobic integrated gradient film material, wherein the film material is prepared from an adhesive resin, an electrically and thermally insulative resin, a thermally and electrically conductive filler (3) and a thermally conductive insulating filler (4), wherein:

the adhesive resin and the electrically and thermally insulative resin form an adhesive layer (1) and a base body (2) bonded together, respectively, with the base body (2) on the adhesive layer (1);

the thermally and electrically conductive filler (3) and the thermally conductive insulating filler (4) are added into an intermediate layer and an upper layer of the base body (2), respectively; the base body (2) is divided into three gradient regions from top to bottom: a thermally conductive insulating region (21), an electrically and thermally conductive region (22) and an electrically and thermally insulative region (23), wherein a super-hydrophobic structure is constructed on a surface of the thermally conductive insulating region (21), wherein the thermally conductive insulating filler (4) is selected from graphene oxide, aluminum nitride ceramic and boron nitride ceramic.

2. The attachable self-resistance heating/super-hydrophobic integrated gradient film material according to claim 1, wherein the electrically and thermally insulative resin is selected from an electrically and thermally insulative resin with a surface energy lower than 50 mN/m.

3. The attachable self-resistance heating/super-hydrophobic integrated gradient film material according to claim 2, wherein the electrically and thermally insulative resin with the surface energy lower than 50 mN/m is selected from a silicone-based resin and a series of fluorine-modified resins.

4. The attachable self-resistance heating/super-hydrophobic integrated gradient film material according to claim 3, wherein the silicone-based resin is selected from polydimethylsiloxane resin, methylphenyl silicone resin and amino silicone resin.

5. The attachable self-resistance heating/super-hydrophobic integrated gradient film material according to claim 3, wherein the series of fluorine-modified resins are selected from fluorine-modified silicone resin, fluorine-modified acrylate resin and fluorine-modified polyurethane resin.

6. The attachable self-resistance heating/super-hydrophobic integrated gradient film material according to claim 1, wherein the super-hydrophobic structure on the surface of the thermally conductive insulating region (21) is constructed by a micro-nano hot embossing.

7. The attachable self-resistance heating/super-hydrophobic integrated gradient film material according to claim 1, wherein the thermally and electrically conductive filler (3) is selected from silver powder particles, copper powder particles, graphite and carbon nanotubes.

8. The attachable self-resistance heating/super-hydrophobic integrated gradient film material according to claim 1, wherein the adhesive resin is selected from epoxy AB glue and polyurethane adhesive.

9. The attachable self-resistance heating/super-hydrophobic integrated gradient film material according to claim 1, wherein the thermally conductive insulating region (21), the electrically and thermally conductive region (22) and the electrically and thermally insulative region (23) are separately prepared, and then subjected to a semi-curing, followed by a joining and a full-curing, to form the three gradient regions.

* * * * *